Aug. 30, 1949.   F. W. AVILA   2,480,211
VEHICLE AXLE SUSPENSION
Filed May 9, 1947   2 Sheets-Sheet 1
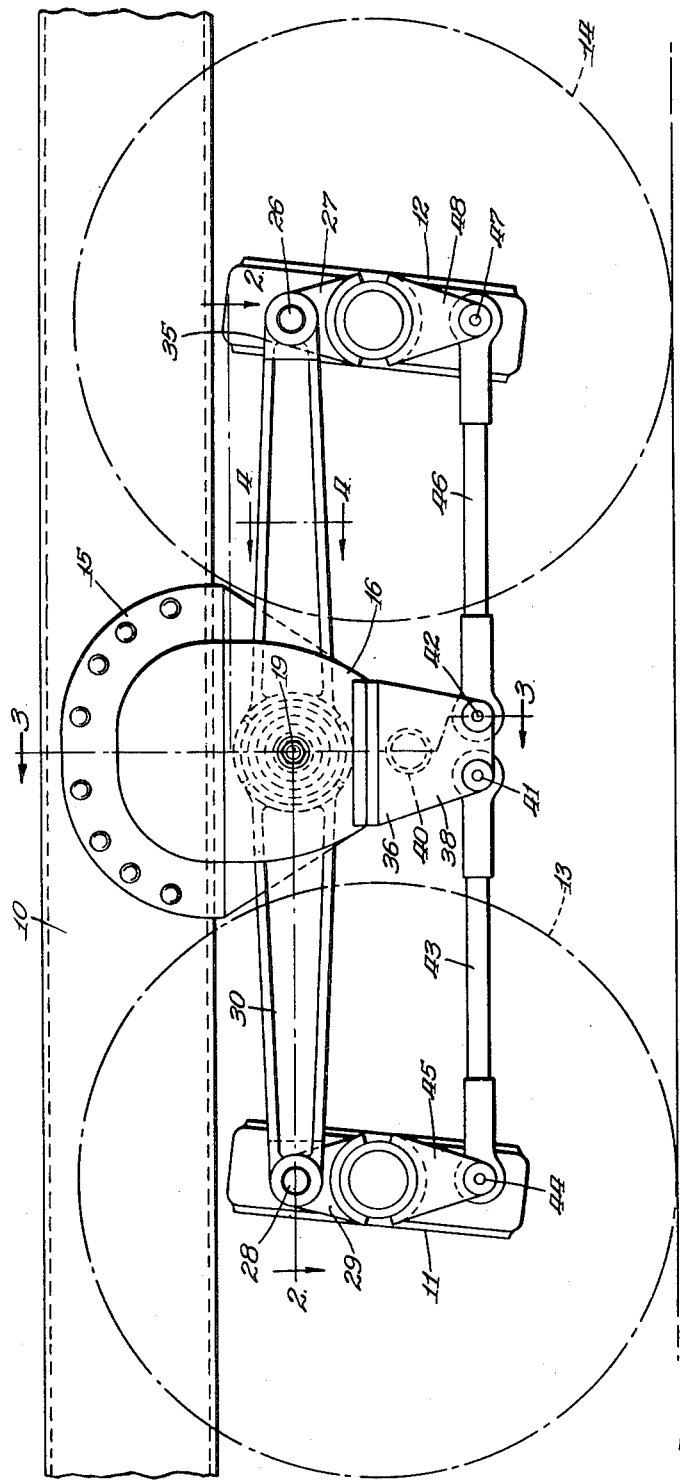
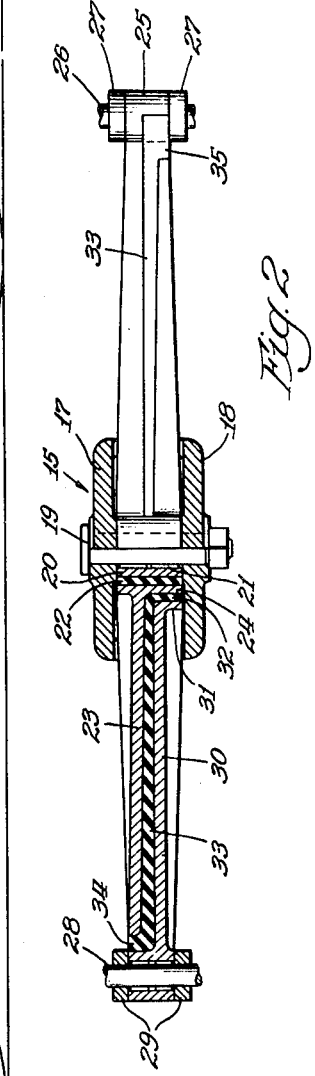
INVENTOR.
Frank W. Avila
BY
Paul O. Pippel
Atty Aug. 30, 1949.　　　　　F. W. AVILA　　　　　2,480,211
VEHICLE AXLE SUSPENSION
Filed May 9, 1947　　　　　　　　　　　　　2 Sheets-Sheet 2
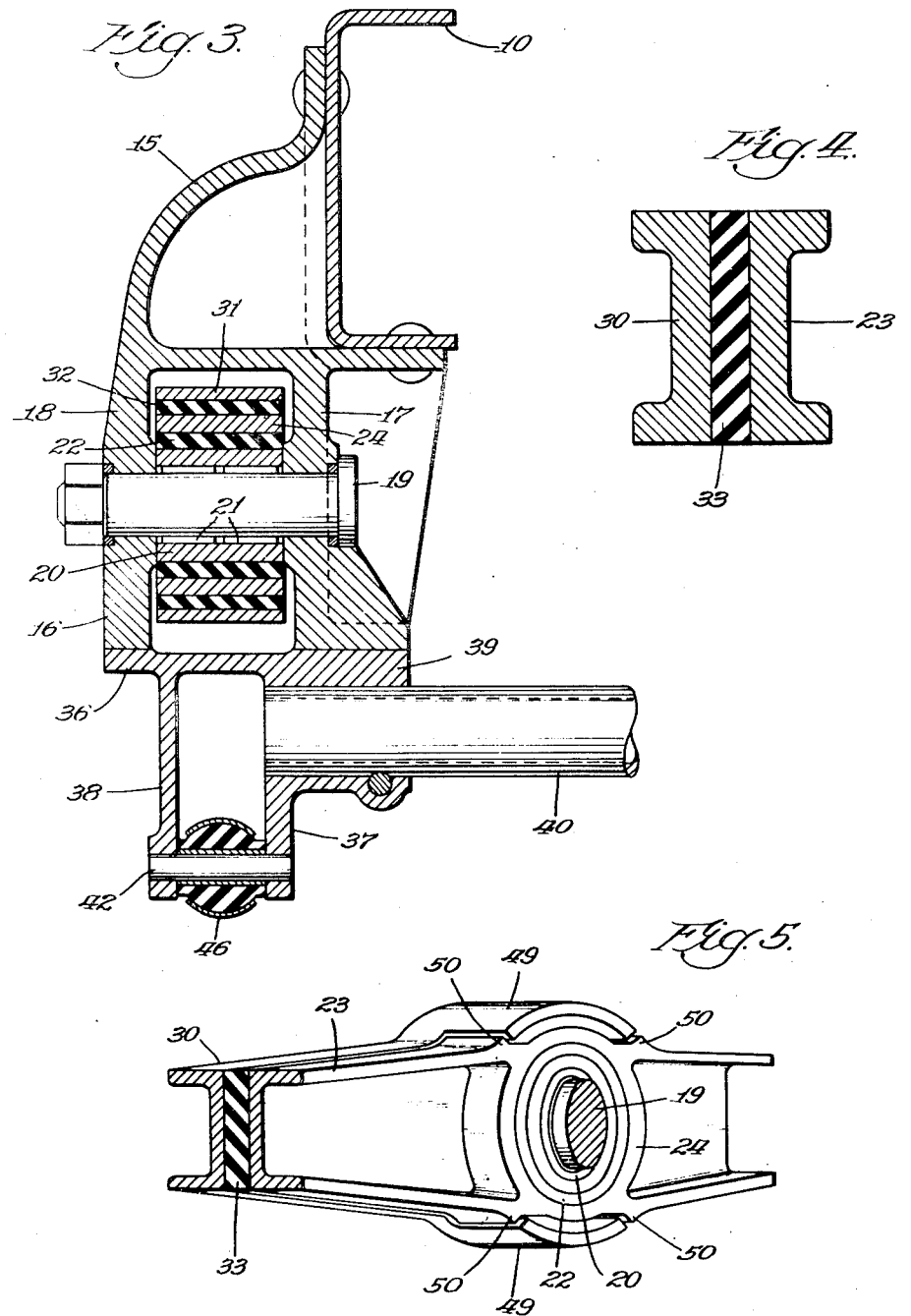
INVENTOR.
Frank W. Avila

UNITED STATES PATENT OFFICE 2,480,211

VEHICLE AXLE SUSPENSION

Frank W. Avila, Columbia City, Ind., assignor to International Harvester Company, a corporation of New Jersey Application May 9, 1947, Serial No. 746,964

9 Claims. (Cl. 280—104.5)

This invention relates to a suspension system for a vehicle axle and has for its principal object the provision of an improved suspension system embodying elastic means such as rubber in association with supporting arms, to the end that conventional coil or leaf springs are eliminated.

The invention finds its greatest usefulness in vehicles having rear axle structures of the tandem or bogie type; although the principles of the invention are applicable in connection with single axle structures. Another object of the invention is to provide a simplified axle suspension system comprising a pair of relatively coextensive lever arms pivoted intermediate their ends on a common axis and resiliently secured together by elastic material such as rubber, whereby the levers, each of which is connected to an axle of a tandem or bogie structure, operate in scissor fashion to accommodate the oscillation of the axles as the vehicle encounters uneven terrain. The arrangement likewise supports and distributes the load of the vehicle on the axles.

The foregoing and other objects and features of the invention will become apparent as the disclosure is more fully made in the following detailed description of a preferred embodiment of the invention as shown in the accompanying sheets of drawings, wherein:

Figure 1 is a side view of the rear portion of a vehicle showing the suspension system as adapted to a tandem or bogie axle structure.

Figure 2 is a longitudinal sectional view taken substantially on the line 2—2 of Figure 1.

Figure 3 is a transverse sectional view, on an enlarged scale, taken on the line 3—3 of Figure 1.

Figure 4 is a transverse sectional view, on the same scale as that of Figure 3, taken on the line 4—4 of Figure 1.

Figure 5 is a fragmentary perspective view taken from the opposite side of the structure shown in Figure 1 and illustrating the means by which relative movement between the suspension arms is limited.

Reference herein will be made to the use of the suspension system in conjunction with the rear axle structure of a vehicle. It should be understood, of course, that a similar system may be employed in conjunction with the front wheels of the vehicle. Hence these expressions, like other expressions used herein, should be taken as illustrative and not limiting.

As shown in Figure 1, a vehicle frame, designated by the numeral 10, may be supported at its rear end on a tandem or bogie axle structure including a transverse front axle 11 and a parallel rear axle 12. The axles 11 and 12 are carried respectively on wheels 13 and 14.

Only one side of the axle structure will be described, it being understood that corresponding components are arranged at the other side of the vehicle frame. The frame carries at a point midway between the axles 11 and 12 bracket structure 15 having a depending housing portion 16 provided with inner and outer walls 17 and 18 (Figure 3). A mounting pin 19 passes through the walls 17 and 18 and is rigidly secured in place therein. A bushing or sleeve 20 is rotatably carried on the pin 19 between the walls 17 and 18, anti-friction bearing means such as needle bearings 21 being provided for that purpose. The bushing or sleeve 20 is surrounded by a sleeve 22 composed of rubber or the like. The rubber sleeve 22 is bonded or otherwise rigidly secured to the sleeve 20. The rubber bushing or sleeve 22 carries a longitudinally extending lever arm 23, the intermediate portion of which is formed with an integral sleeve 24. The outer cylindrical surface of the rubber sleeve 22 is bonded or otherwise secured to the cylindrical inner surface of the sleeve 24 of the lever 23. One end of the lever extends to the right (Figure 2) and includes a bearing portion 25 which is connected by a pivot pin 26 to an upstanding ear 27 rigid on the rear axle 12. The left-hand extension of the lever 23 terminates short of a pivot pin 28 carried in an upstanding bracket 29 on the front axle 11 (Figure 2). The sleeve portion 24 of the lever 23 serves by means to be hereinafter described to support a second lever arm 30. This lever arm is similar to the arm 23 but is reversed with respect to the pivot pins 26 and 28 on the axles 12 and 11 respectively. In other words, the left-hand end of the lever arm 30 is connected to the axle 11 by means of the pivot pin 28 and upstanding ear 29, while the right-hand end terminates short of the pivot pin 26 on the axle 12. The intermediate portion of the lever arm 30 is provided with an integral annular sleeve 31 which surrounds the sleeve 24 of the lever arm 30. The space between the outer cylindrical surface of the sleeve 24 and the inner cylindrical surface of the sleeve 31 is filled by a bushing 32 composed of rubber or the like and formed integral with a longitudinally extending sheet of rubber 33. The sheet portion 33 is interposed between the vertical flanges of the lever arms 23 and 30, and the opposite inner and outer faces of the rubber are respectively bonded or otherwise secured to the proximate faces respectively of the lever arms. At its left-hand end the rubber sheet or member 33 is provided with a transverse extension 34 that fills the space between the bearing portion of the lever arm 30 and the proximate end portion of the lever arm 23. The right-hand end of the rubber member 33 is provided similarly at 35 with an extension that occupies the space between the bearing portion 25 of the arm 23 and the proximate terminal portion of the lever arm 30. It is preferred that the rubber extension portions 34 and 35 overlap the bearing portions of the lever arms respectively; it is also preferred that these portions be bonded or otherwise rigidly secured to their cooperating components.

The supporting bracket 15 carries at its bottom a depending supporting member 36 which is provided with inner and outer walls 37 and 38 respectively. The inner wall 37 is thickened as at 39 and includes a transverse bore which receives the inner end of a transverse tubular brace 40. A similar bracket at the other side of the vehicle frame may be similarly connected to the opposite end of the brace.

The wall portions 37 and 38 are provided with a pair of longitudinally spaced transversely alined pivot pins 41 and 42. The forward pivot pin 41 serves to connect the rear end of a forwardly extending radius rod 43, the forward end of which is pivotally connected at 44 to a depending ear 45 on the front axle 11. The other pivot pin 42 pivotally connects the forward end of a rearwardly extending radius rod 46, the rear end of which is pivotally connected at 47 to a depending ear 48 on the rear axle 12.

From the description thus far it will be seen that the arms 23 and 30 are mounted intermediate their ends on a common transverse axis and may pivot with respect to each other about this axis, relative movement being limited only by the elasticity of the interposed rubber portions 32, 33, 34, and 35. In other words, the lever arms 23 and 30 may have scissor action. The arrangement is such that the load of the vehicle is equally distributed on the axles and is further such that shocks incident to travel of the vehicle over rough terrain are absorbed by the rubber components. The rubber sleeve portion 32 between the sleeves 24 and 31 of the arms 23 and 30, respectively, is torsionally stressed as the arms move relatively. The rubber sheet portions or members 33 are stressed in shear as the arms 23 and 30 move relatively. The combination of the resistance set up by the rubber components provides adequate strength and resiliency to carry the vehicle easily and without undue shock.

As shown in Figure 5 the lever arms 23 and 30 include means for limiting relative movement thereof. This means comprises a pair of arcuate portions 49 formed integral with the central portion of the arm 30 and extending inwardly therefrom toward the vehicle frame 10. The intermediate portion of the lever arm 23 is provided with two pairs of circumferentially spaced stop members in the form of lugs 50. When the lever arms 23 and 30 have moved a predetermined distance relatively, the arcuate portions 49 engage one or the other of the lugs of each pair. The stop means functions during relative oscillation of the lever arms in either direction.

The lever arms 23 and 30, together with the rubber components 33 and 22 and the metal sleeve or bushing 20, may be provided as a unit assembly for easy replacement in the event of wear or damage. The entire construction is of simple and inexpensive arrangement and may be readily adapted to many vehicles of existing types. Other advantages of the invention will appear to those skilled in the art, as will various modifications and alterations in the preferred form of the invention shown and described, all of which may be made without departing from the spirit and scope of the invention as set forth in the appended claims.

What is claimed is:

1. A suspension system for a vehicle having a longitudinal frame member and a tandem axle structure including a pair of transverse, relatively closed spaced apart axles, comprising: a beam structure for supporting the frame member on the axles including a pair of longitudinal, relatively vertically movable beams disposed in side-by-side relationship, one having an end portion proximate to one axle and the other having an end portion proximate to the other axle; means respectively connecting each beam end portion to its proximate axle; means associated with the beam structure intermediate the end portions thereof for connecting the beam structure to the frame member for limited vertical movement with respect thereto; and resilient means extending substantially throughout the length of the longitudinal portions of the beams and connected therebetween for resiliently limiting relative vertical movement between the beams.

2. A suspension system as set forth in claim 1, in which: the beams lie in closely spaced apart, generally parallel relationship; and the resilient means connecting the beams includes rubber bonded to the beams.

3. A suspension system as set forth in claim 2, in which: the beams are pivoted together for relative vertical movement by means including a shaft portion rigid on one beam telescopic and within a sleeve on the other; and the rubber means connecting the beams includes an integral bushing portion interposed annularly between and bonded to the shaft portion and the sleeve.

4. A suspension system as set forth in claim 3, in which: means are provided for cooperation between the beams for positively limiting relative movement between the beams beyond the elastic limit of the rubber means.

5. A suspension system as set forth in claim 1, in which: the beam end portions are connected respectively to the axles at points above the axle centerline; and means including radius rods are connected between the frame member and the axles below the centerlines of the axles.

6. A suspension system for vehicles having a longitudinal frame member and a tandem axle having a pair of transverse axles, comprising: a beam structure connecting the frame member and axles and including a pair of closely spaced parallel beams, extending longitudinally between the axles, each including an intermediate web portion and opposite end portions; means pivotally connecting the beams together at their intermediate web portions for relative scissoring movement about a transverse horizontal axis, said means including structure further pivoting the beams to the frame member; means pivotally connecting the end portion of one beam to one axle; means pivotally connecting the opposite end of the other beam to the other axle; and resilient means connecting the web portions of the beams for resiliently limiting scissoring of the beams.

7. A suspension system at set forth in claim 6, in which: each of the web portions of the beams includes a flat generally vertical, longitudinal surface, the web portions being arranged so that said surfaces are face to face; and the resilient means includes rubber bonded to the web surfaces.

8. A suspension system as set forth in claim 7, in which: the means pivotally connecting the beams together includes a shaft portion on one beam, and a sleeve on the other surrounding the shaft in annularly spaced relation thereto; and the rubber means includes a rubber bushing bonded to the exterior of the shaft and to the interior of the sleeve.

9. A suspension system as set forth in claim 8, in which: means cooperating between the beams is provided to positively prevent excess scissoring of the beams and comprises interengageable stop elements respectively on the sleeve and the other beam.

FRANK W. AVILA.

REFERENCES CITED

The following references are of record in the file of this patent:

UNITED STATES PATENTS

| Number | Name | Date |
| --- | --- | --- |
| 1,388,405 | Clapp | Aug. 23, 1921 |
| 1,912,498 | Rayburn | June 6, 1933 |
| 2,351,001 | Buckendale | June 13, 1944 |